United States Patent

Stewart, Jr.

[15] 3,689,760
[45] Sept. 5, 1972

[54] EFFICIENT REFLECTOR FOR A PROJECTOR

[72] Inventor: George W. Stewart, Jr., Costa Mesa, Calif.
[73] Assignee: Mattel, Inc., Hawthorne, Calif.
[22] Filed: Jan. 25, 1971
[21] Appl. No.: 109,354

[52] U.S. Cl. ............. 240/41.3, 240/41.35 R, 353/98, 355/67
[51] Int. Cl. ............................................. F21v 13/04
[58] Field of Search ........... 240/41.3, 41.35 R, 41.37, 103 R; 353/98; 355/67

[56] References Cited

UNITED STATES PATENTS

| | | | |
|---|---|---|---|
| 3,526,459 | 9/1970 | Elmer | 240/41.35 R X |
| 3,449,561 | 6/1969 | Basil et al. | 240/41.35 R X |
| 2,186,951 | 1/1940 | Bergstrom | 240/41.35 R |
| 2,624,234 | 1/1953 | Gretener | 240/41.3 X |
| 2,415,635 | 2/1947 | Hopkins | 355/67 |
| 1,539,696 | 5/1925 | Ritchie | 240/41.3 |
| 3,164,058 | 1/1965 | Kosowsky | 240/41.3 X |

Primary Examiner—Samuel S. Matthews
Assistant Examiner—Richard L. Moses
Attorney—Seymour A. Scholnick

[57] ABSTRACT

An efficient projector for film slides or the like, which can project a uniformly bright image on a screen using a low wattage lamp and a small diameter projection lens, comprising a reflector for reflecting light from a lamp through a frame area of the film plane and through a lens. The reflector is shaped so that most of the light rays emanating from the lamp are reflected to a small area of the lens plane to enable a small lens to be used, the rays being directed along paths that cause uniform illumination of a predetermined frame area of the film plane.

8 Claims, 4 Drawing Figures

PATENTED SEP 5 1972 3,689,760

GEORGE W. STEWART, JR.
INVENTOR.

BY Max E. Shirk

ATTORNEY

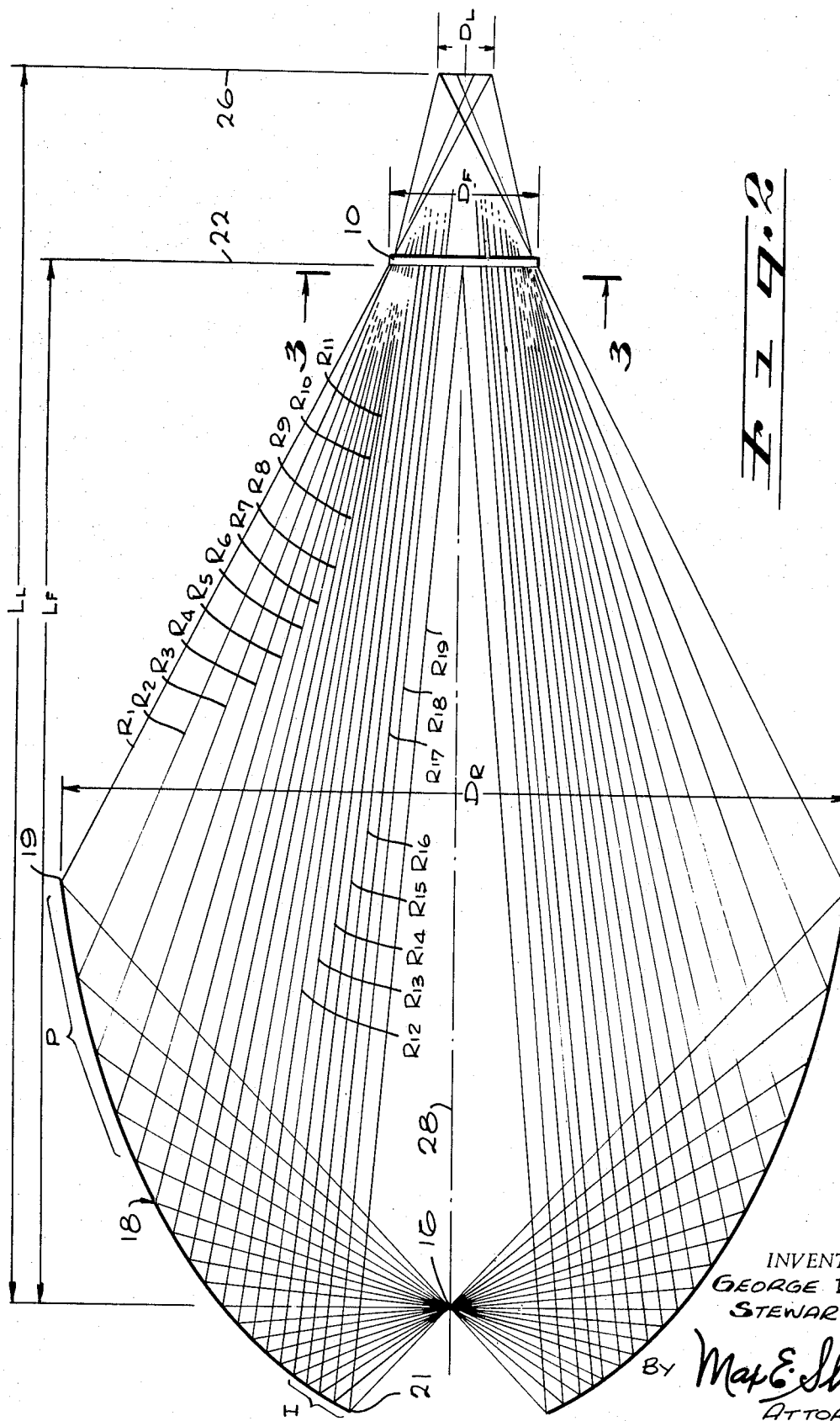

3,689,760

EFFICIENT REFLECTOR FOR A PROJECTOR

BACKGROUND OF THE INVENTION

1. Field of the Invention

This invention relates to optical projectors.

2. Description of the Prior Art

High quality film projectors generally waste most of the light which their lamps produce and therefore require high wattage and low lifetime lamps that create substantial heat. The reason why only a small fraction of light could be used is that heretofore only that fraction could be directed to uniformly illuminate a predetermined film frame area and to then pass through a lens area of reasonably small size. A typical high quality projector has generally employed a lamp with a specially shaped filament and a condensor lens arrangement in front of the lamp. The condenser lenses typically intercepted about 20 percent of the light emanating from the lamp. This is because the condenser lenses subtended a solid angle of about 2.5 steradians about the filament, which is only 20 percent of the $4\pi$ or 12.5 steradians of solid angle that exists about a point. The light over the 2.5 steradians angle was approximately uniformly distributed, and the condenser lenses directed it substantially uniformly through the frame area of the film plane and into a moderately small diameter region at the lens plane. A projector lens at the lens plane then formed an image on a screen. Inasmuch as the projected light represented only about 20 percent of available light, a very bright lamp was required in order to achieve a projected image of high brightness.

Projectors that utilize condenser lenses can attain somewhat greater utilization of light by employing spherical reflectors behind the lamp to reflect additional light towards the condenser lenses in a manner that does not substantially alter the uniform illumination of the film frame area. It might be supposed that the spherical reflectors could reflect back light over an additional 2.5 steradians to double the amount of usable light. HOwever, much of the light reflected by the spherical reflector is intercepted by the lamp filament, so that an effective increase of only 0.5 steradians to 1.5 steradians has been realized, and the total usable light still represents a small portion such as 30 percent of the light available from the lamp.

Projectors have been constructed which utilize reflectors to gather a high percentage of light emanating from a lamp. However, such projectors have been of low quality, in that the projected image was far from uniformly illuminated. One type of low quality projector employs a large elliptical reflector which intercepts more than one-half of the light from a lamp that is substantially a point source. That is, the reflector subtends more than 6 ¼ steradians about the lamp filament. In such a reflector, the lamp has been mounted so that its filament was at one focus of the ellipse of the reflector, while a projection lens was mounted at the other focus of the ellipse. The film frame was located between the two ellipses. The reflector reflected most of the light emanating from the lamp through the film frame and into the small lens, so that a bright image was obtained using a low wattage lamp and small projection lens. However, the projected image was grossly non-uniform, the center portions of the image being very bright while outer portions were very dim. Reflectors constructed to follow any of a variety of regular curves have been proposed, such as circular (to form a sphere), ellipse, parabolic, and hyperbolic. However, reflectors constructed as the surface of revolution of such curves do not enable reflection of a high proportion of light uniformly over a large film frame area into a small lens area.

OBJECTS AND SUMMARY OF THE INVENTION

An object of the present invention is to provide a projector which utilizes a low wattage lamp and small projector lens to project a uniformly bright image.

Another object is to provide a reflector for use in a projector, the reflector being shaped to direct a high proportion of light emanating from a point light source into a lens area of limited diameter through an intermediate film frame area, along light ray paths that substantially uniformly illuminate the film frame area.

In accordance with one embodiment of the present invention, a projector is provided which includes a reflector for surrounding a lamp, a slot for holding a slide or the like in front of the reflector, and a lens in front of the slot for projecting an image of a slide onto a screen. The reflector generally has a shape which does not follow any simple curve, that is, it does not follow a surface that can be defined by a relatively simple equation as can a surface which is the surface of revolution of part of a circle, ellipse, parabola or hyperbola. Instead, the reflector generally has a computer designed surface which is shaped within two constraints. One of the constraints is that a high proportion of rays emanating from the lamp filament be reflected so they pass through a small diameter region of a lens plane. A second constraint is that the rays that enter the small diameter lens region shall have substantially uniformly illuminated a film frame area of predetermined size which lies a distance behind the lens plane. The reflector subtends a large solid angle about the point light source, such as 7 steradians to gather more than half of the light emanating from the lamp, and it reflects nearly all of the intercepted light uniformly through the film frame area and into the small diameter lens area. The utilization of most of the light emanating from the lamp allows a lamp to be employed which has a much lower wattage, resulting in less heat generation, lower power consumption, and longer life. The fact that the light uniformly illuminates the film frame area means that a uniformly illuminated image is projected on the screen. The fact that the reflector directs the light to a small lens area means that a relatively small diameter projector lens can be utilized, to minimize the cost of the projector.

The novel features of the invention are set forth with particularity in the appended claims. The invention will be best understood from the following description when read in conjunction with the accompanying drawings.

BRIEF DESCRIPTION OF THE DRAWINGS

FIG. 4 is a diagrammatic side view of a projector constructed in accordance with another embodiment of the invention.

DESCRIPTION OF THE PREFERRED EMBODIMENTS

Figure 1:
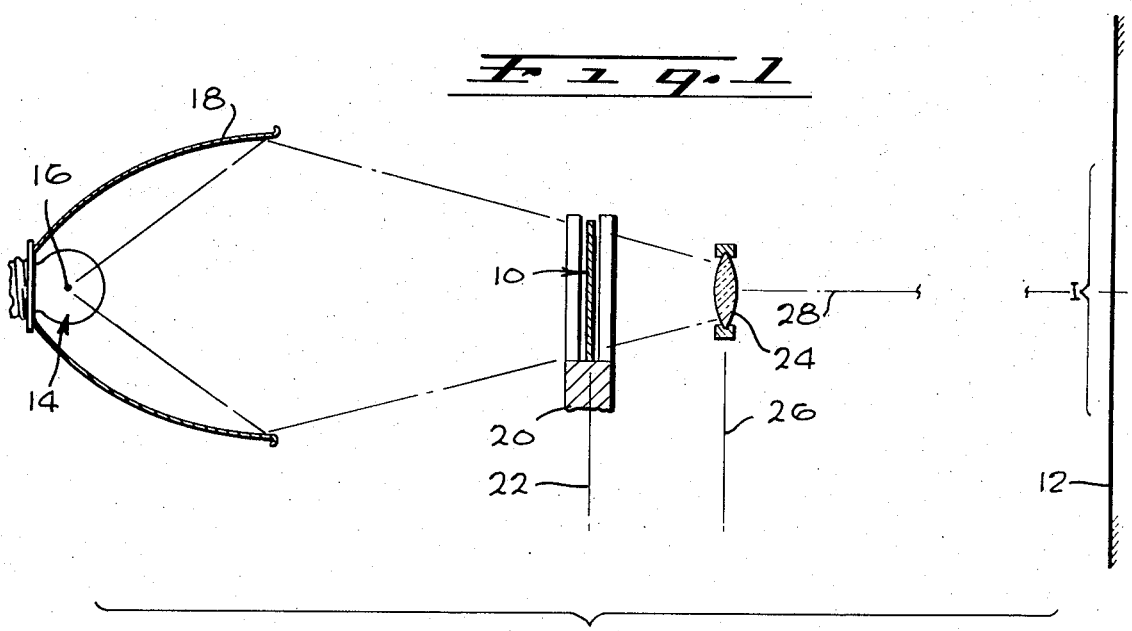
FIG. 1 is a diagrammatic side view of a projector constructed in accordance with one embodiment of the present invention.

FIG. 1 is a simplified view of a projector constructed in accordance with the invention, which projects an image I of a film frame 10 onto a screen 12. The projector includes a lamp 14 with a small filament 16, and a reflector 18 which largely surrounds the lamp. A film frame holder 20 is positioned in front of the reflector to hold the film frame at a predetermined film plane 22. A lens 24 is positioned at a lens plane 26 that lies in front of the film plane 22, to form an image of the film frame 10 onto the screen 12. The reflector 18 intercepts most of the light emanating from the filament 16 and reflects it over predetermined paths. The reflector 18 is shaped so that the reflected light passes through the small area of the lens 24 at the lens plane 26, and so that light reaching the area of lens 24 has previously substantially uniformly illuminated the area of the film frame 10. The fact that most of the light emitted from the filament passes through the lens 24, means that the image I will be bright even if a low wattage lamp is employed. The fact that the light which forms the image I has substantially uniformly illuminated the area of the film frame 10 means that the image will be substantially uniformly illuminated, that is, that different areas of the image I will have a brightness proportional to the transparency of corresponding areas of the film frame 10. The fact that the rays are directed to a relatively small area at the lens plane 24 means that a relatively small diameter lens can be employed, so that a high quality lens can be used without excessive cost.

Figure 2:
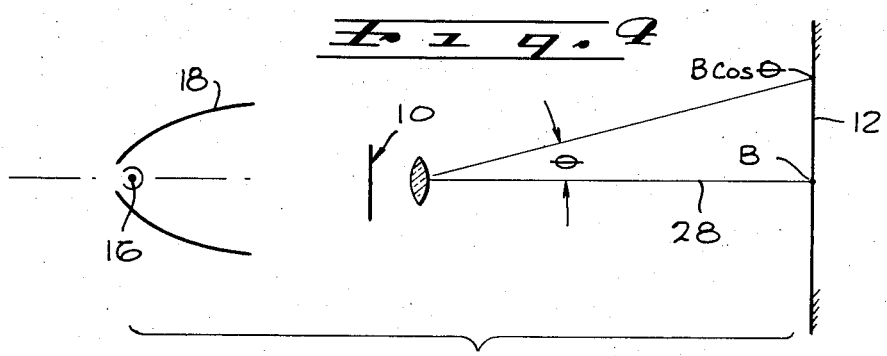
FIG. 2 is a sectional view of the projector of FIG. 1, showing the path of light rays between the lamp and lens plane.
Figure 3:
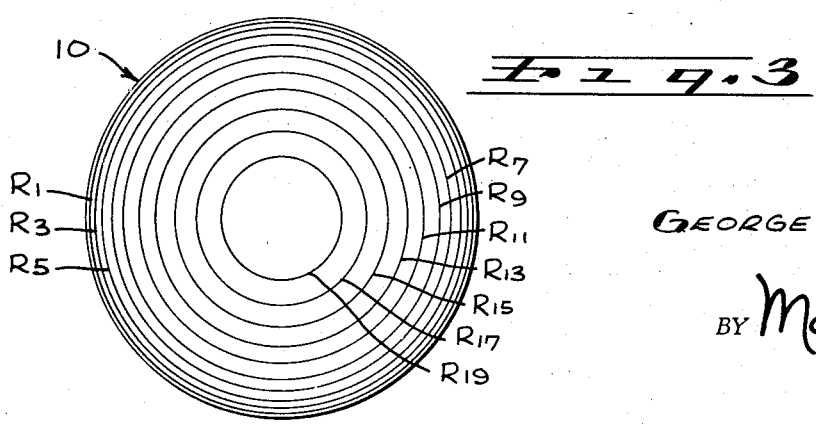
FIG. 3 is a view taken on the line 3—3 of FIG. 2.

FIG. 2 is an enlarged diagrammatic view of the projector, showing the paths of light rays directed by the reflector 18. The filament 16 is assumed to emanate light uniformly in all directions, and the rays illustrated in the Figure each represent the same amount of light flux. The film frame 10 of FIG. 2 is circular, as shown in FIG. 3, so that the reflector 18 can be constructed as a surface of revolution about the optical axis 28. It may be noted that the rays R are spaced increasingly closer together towards the edges of the film frame 10, so that each can cover the same area with the same brightness. The surface of the reflector 18 cannot be defined by any simple equation, as can a spherical, elliptical, parabolic or hyperbolic shape. Instead, the surface of the reflector 18 is shaped, not in accordance with a simple mathematical formula, but to serve under particular circumstances, and to reflect light rays in accordance with particular constraints. One constraint is that substantially all of the rays which the reflector intercepts pass through a limited area at the lens plane 26, this area being contained in a circle of diameter $D_L$ at the lens plane. The shape of the reflector surface is also constrained so that rays passing through the lens area of diameter $D_L$ substantially uniformly illuminate the film frame area 10 of diameter $D_F$ at the film plane 22. The shape of the reflector 18 in FIG. 2 and the ray paths shown are actually copies of a diagram drawn by a plotter connected to a computer. The computer was programmed to design a reflector surface that would reflect intercepted rays from the lamp filament 16 through the limited lens area $D_L$ at the lens plane 26 which was positioned at a predetermined distance $L_F$ from the filament, so as to uniformly illuminate the film frame area. A drawing of the type shown in FIG. 2 was plotted by the computer, and it showed the shape of the reflector and the paths of several rays thereof. It may be noted that between the film plane 22 and lens plane 26, some of the rays cross the optical axis 28 while while others do not. No heed is paid to the paths of the rays, but only their location at the film and lens planes. The particular reflector illustrated in FIG. 2 subtends a solid angle of approximately 9 steradians about the lamp filament.

In designing a reflector for an actual projector, several additional factors must be taken into consideration. First, the lens 24 is generally mounted to move a short distance along the optical axis, to enable a sharp image to be projected onto screeens at various distances from the projector. Thus, a lens is required which is of a size somewhat greater than the diameter $D_L$, so that the lens will receive all of the rays which have passed through the film frame 10 for any position of the lens along its path. In order to minimize the diameter of the lens, a reflector 18 is chosen which is not especially large, inasmuch as the greater the maximum diameter $D_R$ of the reflector in relation to the distance $L_1$ of the lens plane from the filament, the greater the divergence of rays passing through the lens plane, and the greater must be the diameter of a lens in order that it capture all of the rays when moving a given distance along the optical axis. The reflector is generally designed to converge the light rays sufficiently that the area of the lens over the circle of diameter $D_L$ is less than one-half the area of the film frame area over the circle of diameter $D_F$.

Another factor to be considered is that the filament 16 actually does not closely approach a point source. Typically, the filament is a small loop of wire, and its deviation from a true point source results in the need for a somewhat larger lens than would be required for a true point source in order to capture substantially all of the rays passing through the film frame area. The fact that the filament does not radiate evenly in all directions also causes a slight non-uniformity in illumination of the film frame area, but this generally is not disturbing. In a typical installation, the lens diameter may have to be about 60 percent greater than would be the case for a point source. Where the filament is of known size and location, this can be considered in the design of the reflector, particularly where the filament is a surface of revolution about the optical axis 28. However, where the exact shape and orientation of the filament is not known, only an approximation can be made to the reflector design and a somewhat larger lens is required. However, even with a non-point source filament, a bright and almost uniformly illuminated image can be obtained with a lens of relatively small size.

Still another factor that must be considered in the design of a projector is that many slides and other types of film frames that are to be projected are not circular, but are rectangular. Of course, if the entire rectangular region of a slide is small enough to be covered by the film frame area of diameter $D_F$, then a uniformly illuminated image can be projected. However, a large portion such as 40 percent of the available light may then be wasted, resulting in reduced efficiency. If the dimensions of the film frame area are known, the reflector 18 can be designed accordingly. Of course, for a rectangular film frame area, the reflector 18 will not be a surface of revolution about the optical axis. If a projector is to be used for any of several sizes and shapes of film frames, it is possible to supply several reflectors to obtain maximum efficiency with each film frame size and shape.

An additional factor which can be considered in the design of the reflector 18, is that the image of a film frame is generally projected onto a flat screen. Even if the film frame area were uniformly illuminated, the projected image would not be uniformly illuminated. Instead, the image brightness would decrease with increasing distance from the optical axis. FIG. 4 illustrates the situation where the image of a film frame 10 which is uniformly illuminated is projected onto a flat screen 12. A point on the screen 12 which lies on the optical axis has a brightness B. Another point which lies at an angle $\theta$ with the optical axis has a brightness B cos $\theta$. In order to create a more uniform projected image, the reflector 18 is constructed to increase the illumination of peripheral portions of the film frame in an amount to offset decreases due to projection onto a flat screen. The amount of compensation depends upon the angle of spreading of the image from the lens towards the screen, which depends primarily upon the focal length of the lens. The reflector 18 is generally designed for a given projector with a lens of known focal length, so that good compensation can be designed into the reflector. Of course, the correction is such as to increase the light intensity at regions of the film plane 22 in accordance with their distance from the optical axis, to compensate for the decrease which occurs in proportion to the cosine of the angle of the projected image area from the optical axis.

Thus, the invention provides a projector which efficiently utilizes light available from a substantially concentrated source, by the use of a reflector that intercepts a majority of the light emanating from the source. The reflector is designed to reflect light in paths that pass through a small diameter area of a lens plane after having passed through locations on a predetermined film plane area that result in substantially uniform illumination of the film plane area. Although the illumination at the film plane area is usually substantially uniform, there can be deviations from uniformity if required to compensate for some other effect, as for the fact that images are projected onto a flat screen. However, in the usual case the deviation from uniformity is slight. An illumination may be considered uniform if the dimmest region of any consequency is at least 75 percent as intensely illuminated as the average intensity over the entire area. The reflector of the invention does not follow a simple curve such as a spherical, ellipsoidal, parabolic, or hyperbolic form. Instead, the curve is generally designed with the aid of a computer, with the constraints of substantial uniformity or some other brightness profile of illumination at the film plane and reception in a small area at a lens plane. Practical reflector shapes have been designed and drawn that intercept up to 10.3 steradians of the total 12.6 steradians about the lamp. However, the larger the intercepted angle, the larger the reflector and distance to the film plane in relation to the film frame size, and a somewhat smaller angle is generally more practical. In any case, the reflector should intercept more than about one-half of the light, or in other words, it should subtend at least 6 steradians. simply A comparison of the shape of the reflector 18 with smooth curves that can be defined by relatively simple formulas will show some of the differences. Perhaps the closest curve that can be simply defined by a mathematical equation is an ellipse. If an ellipse were drawn with one focus at the light source 16 and the other at the lens plane 26, then all light from the source at 16 would be concentrated at the center (on the optical axis) of the lens plane 26. Instead, for the reflector 18, rays $R_1$ and $R_2$ cross the optical axis behind the lens plane, rays $R_3$–$R_{17}$ cross in front of the lens plane, and rays $R_{18}$ and $R_{19}$ cross in back of the lens plane. The perimeter portion P of the reflector 18 can be considered as that outermost reflector portion that intercepts 20 percent of the light effectively reflected by the reflector. Along the perimeter portion P, reflector parts progressively nearer the perimeter 19 are oriented to direct light rays across points on the optical axis 28 which are progressively nearer the point source 16. Along the radially inner portion I of the reflector, which extends along the inner reflector portion that intercepts 20 percent of the light effectively reflected by the reflector, reflector parts progressively nearer the innermost location 21 are oriented to direct light across points on the optical axis 28 which are progressively nearer the point source 16. The center portion of the reflector, which is around the portion that reflects rays $R_{10}$, directs the rays so they cross the optical axis 28 further forward than any other rays, and particularly, further forward than rays directed by the inner or outer portions I or P.

A method which has been employed to design the reflector involves first establishing the positions of the light source 16 (FIG. 2), film plane 22 and lens plane 26, and the diameter $D_L$ of the lens. Then the innermost ray $R_{19}$ is drawn to pass through the optical axis at the film plane from A second ray $R_{18}$ is drawn from the light source 16 at a small angle from the first ray, and the reflector surface is computed and drawn so that the ray passes through the film plane 22 at a predetermined radial distance from the optical axis thereat. Additional rays are then drawn from the light source 16 so that the same solid angle lies between adjacent rays (after they are revolved about the optical axis 28). The reflector surface is drawn for each ray so that the area at the film plane between two adjacent rays (the rays are assumed revolved) is the same as for the first and second rays. The computer continues to draw rays and portions of the reflector until the next ray would not pass through the lens diameter $D_L$ at the lens plane. If the designer sees that the size of the film frame area 10 is too small, he repeats the run through the program and plotting, choosing a different radial distance at the film plane between the first and second rays. If the film frame area is too large, a different radial distance is chosen for the first two rays. In this way, an efficient reflector is designed that serves in a particular setting.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A projector comprising:
    a housing;
    means defining a film plane within said housing;
    a concentrated light source behind said film plane;
    a projector lens located in front of said film plane, for focusing an image of material at said film plane onto a screen; and
    a reflector disposed about said light source and shaped to reflect light emitted by said light source through said film plane and thence through said lens, said reflector shaped to substantially uniformly illuminate the frame area at said film plane with rays that travel in paths that lead through the area encompassed by said lens, said reflector shaped and positioned with respect to said light source so that substantially all of the light reflected by said reflector passes through said frame area,
    said light source and frame area defining an imaginary optical axis extending from the center of said light source to the center of said frame area, and said reflector having perimeter portions that reflect light rays so they lie on the same side of the optical axis at said reflector as at said frame area, whereby to minimize spreading of the light so that a small projector lens can be used.

2. The projector described in claim 1 wherein:
    said reflector subtends a solid angle of more than 6 steradians about said light source.

3. In an optical system wherein light is directed from a substantially point source through a lens, an imaginary line connecting the point source and the center of the lens defining an optical axis of the system, the improvement comprising:
    a concave reflector disposed about said point source and having a perimeter portion near the reflector perimeter, which is shaped to direct at least some of the light rays across said optical axis, with reflector portions thereof progressively nearer said perimeter oriented to direct light across points on said optical axis which are progressively nearer said point source;
    said reflector having a radially inner portion near the radially innermost location that is shaped to direct at least some of the light rays across said optical axis, with regions of said inner portion progressively nearer said radially innermost location oriented to direct light across points on said optical axis which are progressively nearer said point source.

4. In an optical system wherein light is directed from a substantially point source through a lens, an imaginary line connecting the point source and the center of the lens defining an optical axis of the system, the improvement comprising:
    a concave reflector disposed about said point source and having a perimeter portion near the reflector perimeter, which is shaped to direct at least some of the light rays across said optical axis, with reflector portions thereof progressively nearer said perimeter oriented to direct light across points on said optical axis which are progressively nearer said point source;
    said reflector being shaped to substantially uniformly illuminate a film frame area located between said point source and lens.

5. In an optical system wherein light is directed from a substantially point source through a lens, an imaginary line connecting the point source and the center of the lens defining an optical axis of the system, the improvement comprising:
    a concave reflector disposed about said point source and having a perimeter portion, an inner portion, and a middle portion halfway between said perimeter and middle portions, all of said portions reflecting light through said lens, said reflector shaped so that said middle portion reflects light rays to cross said optical axis further from said light source than light rays reflected by said inner or perimeter portions.

6. In an optical system wherein light is directed from a substantially point source through a lens, an imaginary line connecting the point source and the center of the lens defining an optical axis of the system, the improvement comprising:
    a concave reflector disposed about said point source and having a radially inner region near the center of the reflector, which is shaped to direct at least some of the light rays across said optical axis, with reflector portions of said radially inner region which are progressively nearer said center of said reflector oriented to direct light across points on said optical axis which are progressively nearer said point source.

7. The improvement described in claim 6 including:
    means for holding a lens in front of said point source and at a position along said optical axis in front of a location where some of said rays have crossed said optical axis and behind the positions where other of said rays would cross said optical axis if they were not interrupted.

8. A method for constructing a reflector that can reflect light from a substantially point light source onto a film plane spaced from the light source, in a manner that substantially uniformly illuminates a region of said film plane about the center thereof where an imaginary optical axis extending from said light source crosses said film plane, comprising:
    positioning a plurality of successive reflective elements that are located progressively further from said optical axis and which are oriented so they can reflect successive rays emanating from a location representing said light source in directions that cross said film plane at points thereon that are progressively further from said center thereof;
    said reflective elements being located and oriented so that predetermined rays emanating from said light source location and angularly spaced from one another thereabout to provide the same said angle between pairs of adjacent rays when they are revolved about said optical axis, are directed to cross said film plane at locations radially spaced from the center of said film plane, selecting the radial distance along the film plane of each ray from the said optical axis so that successive pairs of said predetermined rays are radially spaced from one another by distances inversely proportional to the radial distance of the ray from the center of the film plane; and forming a reflector which, at a cross-section which includes said optical axis, defines a reflector surface of the same curvature as an imaginary line that smoothly connects the locations of said successive reflective elements.

* * * * *